UNITED STATES PATENT OFFICE.

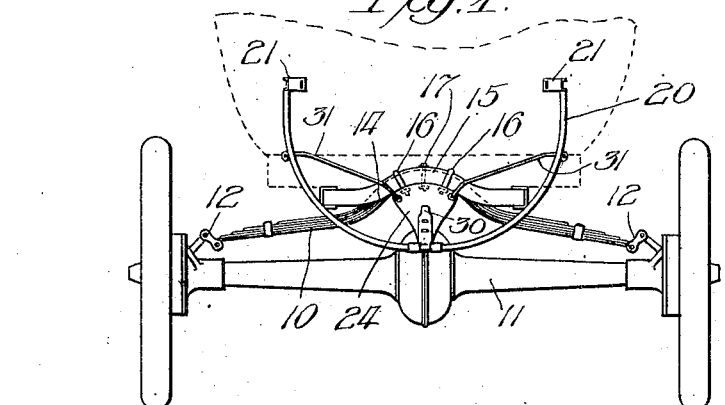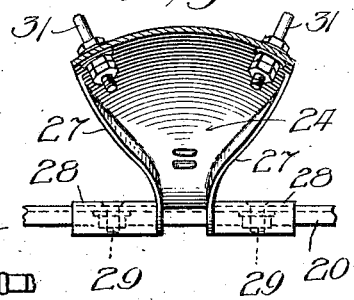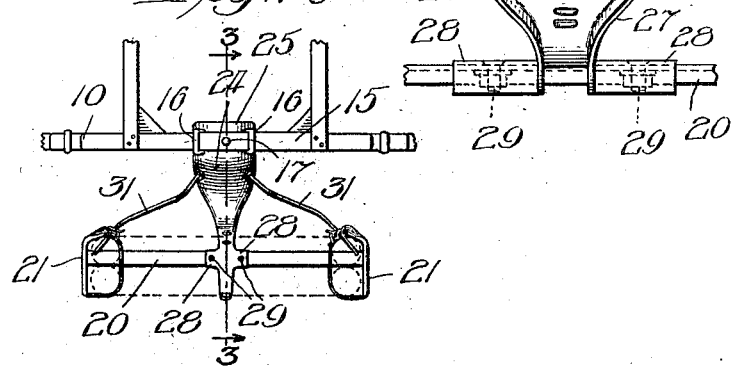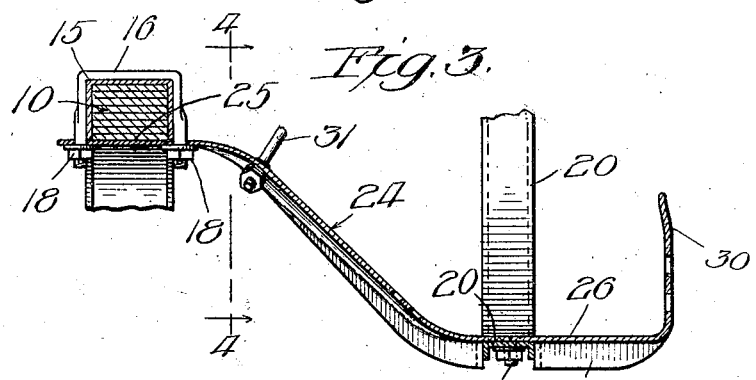

THOMAS I. DUFFY, OF CHICAGO, ILLINOIS, ASSIGNOR TO E. C. SALES CO., OF CHICAGO, ILLINOIS, A CORPORATION OF ILLINOIS.

TIRE-CARRIER.

1,152,013.  Specification of Letters Patent.  Patented Aug. 31, 1915.

Application filed October 26, 1914.  Serial No. 868,610.

*To all whom it may concern:*

Be it known that I, THOMAS I. DUFFY, a citizen of the United States, and a resident of Chicago, in the county of Cook and State of Illinois, have invented certain new and useful Improvements in Tire-Carriers; and I do hereby declare that the following is a full, clear, and exact description thereof, reference being had to the accompanying drawings, and to the characters of reference marked thereon, which form a part of this specification.

This invention relates to improvements in rear tire carriers for automobiles and refers to the manner of attaching the tire carrier to the rear part of the vehicle and also to the general construction of the carrier.

Among the objects of the invention is to provide a simple means for attaching the carrier to a part of the vehicle well calculated to withstand the weight borne by the carrier, and so constructed as to render unnecessary the use of attaching fittings, bolts or screws, and also avoid the necessity of perforating the body to provide bolt or screw holes therein to receive attaching bolts or screws.

A further object of the invention is to provide a rigid carrier structure of small weight as compared to its carrying capacity and one which may be produced at small expense.

The invention consists in the matters hereinafter set forth and more particularly pointed out in the appended claims.

In the drawings:—Figure 1 is a partial rear view of an automobile, showing my improved tire carrier applied thereto. Fig. 2 is a top plan view of the carrier with a portion of the vehicle frame. Fig. 3 is an enlarged section on the line 3—3 of Fig. 2. Fig. 4 is a section of the bracket as seen from the line 4—4 of Fig. 3.

As shown in the drawings, 10 designates the rear semi-elliptical spring of the vehicle which is connected at its ends to the rear axle 11 by the shackles 12. The central portion of the said spring is curved sharply upwardly or arched at 14 to fit a similarly arched portion of a channel shaped bar 15 which constitutes part of the body frame. The spring is attached to the said bar 15 by means of clips 16, 16 of a familiar form and a bolt 17, the lower ends of the clips and bolt being screw-threaded to receive clamping nuts 18.

20 designates the supporting frame of the carrier which is made part circular in form with the ends thereof straightened to permit a tire or tires to be vertically inserted into or removed from the carrier. The frame is provided at its upper ends with two saddle members 21, 21 attached thereto in any suitable manner to afford a suitably wide seat for the tire or tires. The said saddle members are slotted to receive straps by which to secure the tire or tires in the carrier. The frame 20 is preferably made of channel cross section, with the flanges directed outwardly and downwardly, and with the web facing upwardly to constitute a portion of the tire seat.

24 designates a bracket by which the carrier frame is attached to the vehicle. Said bracket is preferably made of sheet metal by a stamping operation. It comprises a wide front end portion 25 which is transversely curved to conform to and fit against the under side of the arched portion 14 of the spring 10. The said widened front end of the bracket is provided with openings to receive the lower ends of the spring attaching clips 16 and the bolts 17, and the bracket is clamped in place against the lower side of the spring by the nuts 18 of the bolt and said spring attaching clips. The front end of the bracket, therefore, constitutes a tie element between the clips so that the usual tie bars may be omitted.

The bracket is inclined downwardly and rearwardly from its point of attachment to the spring and is tapered to terminate in a horizontal neck portion 26 to which the carrier frame 20 is directly attached. The said horizontal or neck portion 26 is preferably made of channel cross section, and the flanges 27 thereof are carried partially up along the side edges of the inclined and widened portions of the bracket so as to stiffen the bracket against both bending and torsional stresses. The horizontal or neck portion 26 of the bracket is provided with short, laterally extending arms 28, which are also preferably flanged at their side edges to give them channel cross section, said flanges being continuations of the flanges 27. The said flanges of the arms 28 are spaced at such distance apart as to snugly receive the carrier frame 20, as shown in Fig. 3, and said carrier frame is attached to the bracket by means of bolts 29 which extend through said arms and the web of the carrier frame. The engagement of the flanges of the carrier frame with the flanges of said arms, as best shown in Fig. 3, greatly strengthens the attachment of the carrier frame to the bracket to prevent front and rear tipping of said frame relatively to the bracket. The horizontal or neck portion 26 of the bracket constitutes also a saddle member to support the tire or tires, and may be provided with slots to receive a holding strap. The rearmost end of the said bracket may be turned upwardly to constitute a standard 30 to receive and support a license sign or tail light, or both.

The tire carrier is further connected to the bracket by means of brace rods 31, 31 which extend through the upper wider part of the bracket and diverge upwardly and outwardly therefrom and extend through and are attached to the frame 20. As herein shown, said rods are screw-threaded at their ends to receive nuts by which the rods are fastened in place. Said brace rods serve to tie the outer ends of the carrier frame fixedly to the wider, rigid part of the bracket at points of the bracket near its attachment to the spring, and brace said frame against movement in all directions relatively to the bracket. By making the front end of the bracket wide and transversely curved said bracket is strengthened to withstand bending and torsional strains, due to the weight of the load carried by the rear end of the bracket. This construction also materially increases the strength of the connection between the bracket and the vehicle. The flanged rear end 26 of the bracket and the flanged arms 28 thereof provide a rigid connection between the bracket and the carrier frame, and this connection is reinforced by the brace rods 31.

An important practical advantage of the carrier construction lies in the manner in which it is attached to the vehicle. By forming the wider forward end of the bracket to constitute a tie element for the spring clips, it becomes unnecessary to employ special attaching means for the carrier or to perforate the body for attachment of the carrier to the vehicle. Moreover, the load is carried by the vehicle at a point where it is amply capable of sustaining the weight.

It will be apparent that the construction described provides a very rigid, strong and durable carrier, and one which is extremely light as compared to its load carrying capacity.

It will be understood that the invention is capable of assuming slight variations from the preferred embodiment shown in the drawings, and that it is not limited to the structural details shown except as hereinafter made the subject of specific claims and as imposed by the prior art. For instance, the tire carrier frame 20 may assume other forms to suitably engage and support the tire.

I claim as my invention:—

1. In combination with a vehicle spring having a central arched portion and a body member to which the spring is attached with attaching members for fastening the spring to said body member, of a tire carrier comprising a tire receiving frame and a bracket, to the rear end of which said frame is attached, the forward end of the said bracket being widened and transversely curved to fit the central arched portion of said spring and having means whereby it is attached to the vehicle by the said spring attaching members.

2. In combination with a vehicle spring having a central arched portion and a body member to which the spring is attached with attaching members for fastening the spring to said body member, of a tire carrier comprising a tire receiving frame and a bracket, to the rear end of which said frame is attached, the forward end of the said bracket being widened and transversely curved to fit the central arched portion of said spring and having means whereby it is attached to the vehicle by the said spring attaching members, and brace members extending between and connecting the wider curved portion of the bracket to said carrier frame.

3. In combination with a vehicle spring having a central arched portion, an arched body member fitted thereover and clips for fastening the body member to said spring at the arched portions thereof, of a tire carrier comprising a tire carrier frame and a supporting bracket attached at its rear end to the carrier frame, said bracket being widened at its front and transversely curved at its widened portion to fit the arched portion of the spring and provided with holes to receive clips whereby the bracket is fastened to said spring and body bar and constitutes a tie member for said clips.

4. A rear tire carrier for automobiles comprising in combination with a part circular carrier frame of approximately one-half of the circular dimensions of the tire to be carried, of a supporting bracket therefor attached centrally to the frame and widened at its front attaching end and tapered toward its rear carrier frame supporting end, with means for attaching the said carrier frame to the rear narrow end of the bracket, and braces extending between and connecting the wider attaching portion of the bracket and the ends of the said carrier frame.

5. A rear tire carrier for automobiles comprising, in combination with a part circular carrier frame, of a centrally disposed attaching and supporting bracket therefor, said bracket being widened and transversely curved at its front end and inclined downwardly and tapered toward its rear end, the narrow end of the carrier being of channel cross section and provided with laterally extending channel arms and the carrier frame being fitted within and attached to said channel arms, and diverging braces extending between and connecting the wider front portion of the bracket and the said carrier frame.

6. In combination with a vehicle spring having an arched portion and a body member to which the spring is attached with attaching members for fastening the spring to said body member, of a tire carrier comprising a tire receiving frame and a bracket, to the rear end of which said frame is attached, the forward end of said bracket being widened and transversely curved to fit the central arched portion of said spring and having means whereby it is attached to the vehicle by the said attaching members, the extreme rear end of said narrower portion of the bracket constituting an upright standard to support a tail light or license sign.

7. In a tire carrier, an attaching and supporting bracket formed with a wide, transversely curved, apertured front supporting portion, inclined rearwardly and tapered therefrom toward its rear narrow end and provided at said rear end with laterally extending, flanged carrier frame supporting arms, said narrow rear end of the bracket being provided with stiffening flanges which extend upwardly along the sides of the inclined wider portion of the bracket.

8. In a tire carrier, an attaching and supporting bracket formed with a wide, transversely curved, apertured front supporting portion, inclined rearwardly and tapered therefrom toward its rear end and provided at said rear narrow end with laterally extending, flanged carrier frame supporting arms, said narrow rear end of the bracket being provided with stiffening flanges which extend upwardly along the sides of the inclined wider portion of the bracket, and the rear end of the bracket being formed to provide an upstanding lamp or license sign supporting standard.

In testimony, that I claim the foregoing as my invention I affix my signature in the presence of two witnesses, this 1st day of October, A. D. 1914.

THOMAS I. DUFFY

Witnesses:
W. L. HALL,
G. E. DOWIE.

Copies of this patent may be obtained for five cents each, by addressing the "Commissioner of Patents, Washington, D. C."